(12) United States Patent
Flickner et al.

(10) Patent No.: US 6,577,329 B1
(45) Date of Patent: Jun. 10, 2003

(54) METHOD AND SYSTEM FOR RELEVANCE FEEDBACK THROUGH GAZE TRACKING AND TICKER INTERFACES

(75) Inventors: Myron Dale Flickner, San Jose, CA (US); David Bruce Koons, San Jose, CA (US); Qi Lu, San Jose, CA (US); Paul Philip Maglio, Santa Cruz, CA (US); Carlos Hitoshi Morimoto, Sao Paulo (BR); Edwin Joseph Selker, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,200

(22) Filed: Feb. 25, 1999

(51) Int. Cl.[7] .................................................. G09G 5/00
(52) U.S. Cl. ........................ 345/774; 345/831; 345/854
(58) Field of Search ................................ 345/774, 810, 345/831, 854, 865–866, 707–708, 713, 781, 784–785, 825, 853, 863

(56) References Cited

U.S. PATENT DOCUMENTS

| | | | |
|---|---|---|---|
| 4,950,069 A | * 8/1990 | Hutchinson | 351/210 |
| 5,016,282 A | 5/1991 | Tomono et al. | 382/117 |
| 5,507,291 A | 4/1996 | Stirbl et al. | 600/407 |
| 5,572,596 A | 11/1996 | Wildes et al. | 382/117 |
| 5,649,061 A | 7/1997 | Smyth | 706/16 |
| 5,762,611 A | 6/1998 | Lewis et al. | 600/544 |
| 5,825,355 A | * 10/1998 | Palmer et al. | 345/708 |
| 5,886,683 A | 3/1999 | Tognazzini et al. | |
| 5,898,423 A | * 4/1999 | Tognazzini et al. | 345/158 |
| 5,920,477 A | * 7/1999 | Hoffberg et al. | 382/181 |
| 5,959,621 A | * 9/1999 | Nawaz et al. | 345/733 |
| 5,987,415 A | 11/1999 | Breese et al. | |
| 6,067,565 A | 5/2000 | Horvitz | 709/218 |
| 6,134,644 A | * 10/2000 | Mayuzumi et al. | 345/705 |
| 6,182,098 B1 | * 1/2001 | Selker | 345/649 |
| 6,185,534 B1 | 2/2001 | Breese et al. | |
| 6,212,502 B1 | 4/2001 | Ball et al. | |
| 6,351,273 B1 | * 2/2002 | Lemelson et al. | 345/786 |

OTHER PUBLICATIONS

Johnmarshall Reeve, "The Face of Interest", Motivation and Emotion, vol. 17, No. 4, 1993, pp. 353–375 12 Pages Total.
Johnmarshall Reeve and Glen Nix, "Expressing Intrinsic Motivation Through Acts of Exploration and Facial Displays of Interest", Motivation and Emotion, vol. 21, No. 3, 1997, pp. 237–250, 8 Pages Total.
H. Rex Hartson and Deborah Hix, "Advances in Human-Computer Interaction", vol. 4, Virginia Polytechnic Institute and State University, ABLEX Publishing Corporation, Norwood, New Jersey, pp. 151–190, May 1993.
Paul P. Maglio, Rob Barrett, Christopher S. Campbell, Ted Selker, IBM Almaden Research Center, San Jose, CA., "Suitor: An Attentive Information System", IUI2000: The International Conference on Intelligent User Interfaces, pp. 1–8.
Erik D. Reichle, Alexander Pollatsek, Donald L. Fisher, and Keith Rayner, University of Massachusetts at Amherst, "Toward a Model of Eye Movement Control in Reading", Psychological Review 1998; vol. 105, No. 1, pp. 125–157.

(List continued on next page.)

Primary Examiner—Sy D. Luu
(74) Attorney, Agent, or Firm—McGinn & Gibb, PLLC

(57) ABSTRACT

A system and method (and signal medium) for interactively displaying information, include a ticker display for displaying items having different views, a tracker for tracking a user's eye movements while observing a first view of information on the ticker display, and a mechanism, based on an output form the tracker, for determining whether a current view has relevance to the user.

54 Claims, 3 Drawing Sheets

OTHER PUBLICATIONS

Robert J.K. Jacob, Human–Computer Interaction Lab, Naval Research Laboratory, Washington, D.C., "What You Look at is What You Get: Eye Movement–Based Interaction Techniques", CHI '90 Proceedings, Apr. 1990, pp. 11–18.

Lisetti, et al, "An Environment to Acknowledge the Interface between Affect and Cognition", pp. 78–86.

Black et al., "Recognizing Facial Expressions in Image Sequences using Local Parameterized Models of Image Motion", pp. 1–35, Mar. 1995.

Lien, et al, "Automatically Recognizing Facial Expressions in the Spatio–Temporal Domain", Oct. 19–21, 1997, Workshop on Perceptual User Interfaces, pp. 94–97, Banff, Alberta, Canada.

Lien, et al., "Subtly Different Facial Expression Recognition And Expression Intensity Estimation", Jun. 1998, IEEE, Published in the Proceedings of CVPR'98, Santa Barbara, CA.

Lien, et al, "Automated Facial Expression Recognition Based on FACS Action Units", Apr. 14–16, 1998, IEEE, Published in the Proceedings of FG '98, Nara, Japan.

Morimoto, et al., "Pupil Detection and Tracking Using Multiple Light Sources".

Ebisawa, et al, "Examination of Eye–Gaze Detection Technique Using Two Light Sources and the Image Difference Method", SICE '94, Jul. 26–28, 1994.

Ebisawa, Y., "Improved Video–Based Eye–Gaze Detection Method", IMTC '94 May 10–12, 1994.

Ohtani, et al., "Eye–Gaze Detection Based on the Pupil Detection Technique Using Two Light Sources and the Image Difference Method", Sep. 20–23, 1995, pp. 1623–1624.

Y. Ebisawa, "Unconstrained pupil detection technique using two light sources and the image difference method", Visualization and Intelligent Design in Engineering, pp. 79–89, 1995.

Kumakura, S., "Apparatus for estimating the drowsiness level of a vehicle driver", Jul. 28, 1998, pp. 1–2.

Eriksson, M., "Eye–Tracking for Detection of Driver Fatigue", IEEE Conference on Intelligent Transportation Systems, Nov. 9–12, pp. 314–319.

Funada, et al., "On an Image Processing of Eye Blinking to Monitor Awakening Levels of Human Beings", IEEE Conference, pp. 966–967., 1996.

Kamitani, et al., "Analysis of perplex situations in word processor work using facial image sequence", SPIE vol. 3016, pp. 324–334., 1997.

Tomono, et al., "A TV Camera System which Extracts Feature Points for Non–Contact Eye Movement Detection", SPIE vol. 1194 Optics, Illumination, and Image Sensing for Machine Vision IV (1989), pp. 2–12.

Pantic, et al., "Automation of Non–Verbal Communication of Facial Expressions", pp. 86–93.

Pantic, et al., "Automated Facial Expression analysis", pp. 194–200.

Morimoto, et al., "Recognition of Head Gestures Using Hidden Markov Models".

* cited by examiner

METHOD AND SYSTEM FOR RELEVANCE FEEDBACK THROUGH GAZE TRACKING AND TICKER INTERFACES

CROSS-REFERENCE TO RELATED APPLICATION

The present application is related to U.S. patent application Ser. No. 09/257,208, filed on Feb. 25, 1999, to Dryer et al., entitled "METHOD AND SYSTEM FOR REAL-TIME DETERMINATION OF A SUBJECT'S INTEREST LEVEL TO MEDIA CONTENT", assigned to the present assignee, and incorporated herein by reference.

BACKGROUND OF THE INVENTION

The present invention generally relates to a display, and more particularly to a display with eye-tracking for judging relevance, to a user, of information being displayed on the display in a "ticker-like" fashion, and a method therefor.

DESCRIPTION OF THE RELATED ART

With the explosive growth of digital cyberspace, "ticker-like" displays have recently emerged as one of the dominant user interfaces for Internet-based information systems.

Ticker displays are particularly useful for displaying highlights for a large variety of frequently updated information, such as stock quotes, sports scores, traffic reports, headline news, etc.

Typically, a ticker display uses an area of a computer screen to scroll text and/or image items continuously in a predetermined pattern (e.g., from left to right, from bottom to top, etc.). These are widely used by webcasting or Internet push systems, such as PointCast. Further, ticker displays have also been deployed by many popular websites such as MyYahoo, ESPN Sports Zone, and ABC News for similar purposes.

However, currently there is no way of knowing whether the user is viewing the ticker display, or whether the information being displayed by the ticker display has relevance to the user, and there is no way for advertisers and the like to capitalize on or change the information being displayed.

SUMMARY OF THE INVENTION

In view of the foregoing and other problems of the conventional systems and methods, it is an object of the present invention to provide a system for viewing information and data which is user-interactive.

Another object of the invention is to provide a system which integrates eye-tracking technology with ticker-like interfaces to significantly enhance the usability of the ticker interface.

Yet another object of the invention is to provide a system for generating relevance feedback which is helpful in improving the quality of Internet-based information systems.

A further object is to provide a system which determines whether the user is viewing the information being displayed, and, if so, determining a level of relevance to the user of the information being displayed by the ticker display.

In a first aspect of the present invention, a method for interactively displaying information, includes a display for displaying items having different views, a tracker for tracking a user's eye movements while observing a first view of information on the display, and a mechanism, based on an output, from the tracker, for determining whether a current view has relevance to the user.

In a second aspect of the present invention, a method for interactively displaying information, includes displaying items having different views, tracking a user's eye movements while observing a first view of information on the display, and, based on the tracking, determining whether a current view has relevance to the user.

With the unique and unobvious aspects and features of the present invention, the system can determine whether the user is viewing the ticker display, and, if so, whether the information being displayed by the ticker display has relevance to the user. Further, the present invention provides a hassle-free way of providing relevance feedback for the information being displayed and can automatically change the amount and type of information being displayed to a particular user. Thus, the system is adaptive to the user's interests and preferences, and thereby advertisers and the like can capitalize on or change the information being displayed to the particular user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
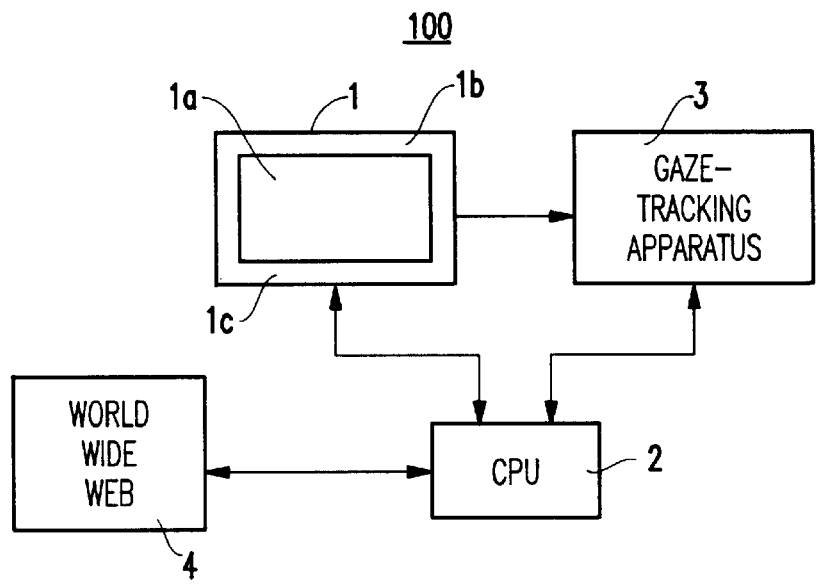
FIG. 1 illustrates schematically an environment and configuration of a system 100 integrating a ticker display with an eye tracking apparatus according to the present invention.

Referring now to the drawings, and more particularly to FIGS. 1–3B, there is shown a preferred embodiment of the present invention.

FIG. 1 illustrates a system 100 for viewing information and data which is interactive, and more specifically a system which integrates eye-tracking technology with ticker-like interfaces to significantly enhance the usability of the ticker interface and to generate relevance feedback which is helpful in improving the quality of information systems such as Internet-based information systems.

The system 100 includes a commercially-available display 1, for receiving data inputs such as images and the like from a central processing unit (CPU) 2 or the like, and for providing a viewable output to a user. The display has a main display area 1a (e.g., main text window), as well as an area 1b for menu bars, tool bars, and the like, and an area 1c for ticker-like displays to scroll across the screen.

The display 1, operatively coupled and interfaced with the CPU 2, may be implemented by any suitable computer display with sufficient ability to depict graphical images. For example, the display 1 may include a cathode ray tube (CRT), liquid crystal diode (LCD) screen, light emitting diode (LED) screen, or another suitable video apparatus.

A gaze-tracking apparatus 3 including a camera, for example, is provided either mounted in/on the display 1 or adjacent thereby and coupled to the display 1 and the CPU 2 to provide an input to the display 1.

Specifically, the gaze-tracking technology uses cameras, and infrared or other devices to sense, locate and follow the movement of a user's eyes.

A number of different gaze tracking approaches, suitable for the present invention, are surveyed in Young et al., "Methods & Designs: Survey of Eye Movement Recording Methods", *Behavior Research Methods & Instrumentation*, 1975, Vol.7(5), pp. 397–429, which is incorporated herein in its entirety: Ordinarily skilled artisans, having the benefit of this disclosure, will also recognize a number of different devices suitable for use as the apparatus 3.

As a specific example of one gaze tracking approach for use in the present invention, reference is made to the following patents, mentioned above and incorporated herein in their entirety: (1) U.S. Pat. No. 4,536,670 to Hutchinson, issued Jun. 6, 1989 and entitled "Eye Movement Detector"; (2) U.S. Pat. No. 4,950,069 to Hutchinson, issued Aug. 21, 1990 and entitled "Eye Movement Detector With Improved Calibration and Speed"; and (3) U.S. Pat. No. 4,595,990 to Garwin et al., issued Jun. 17,1986 and entitled "Eye Controlled Information Transfer". Also, although the invention's gaze tracking apparatus 2 may be a custom product, a commercially available product may be used instead, such as the EyeTrac Series 4000 product by Applied Science Labs, or the EyeGaze system by LC Technologies, Inc.

Advantageously, the invention is capable of accurate operation with inexpensive, relatively low-resolution gaze tracking apparatuses. For instance, significant benefits can be gained with gaze tracking accuracy ±3 degrees, which is a low error requirement for gaze tracking systems. With this level of permissible error, the gaze tracking apparatus 3 may comprise an inexpensive video camera, many of which are known and becoming increasingly popular for use in computer systems.

Thus, the gaze tracking apparatus monitors eye orientation of a user (operator) as the operator views a display 1 having items displayed thereon in a ticker-like fashion. According to the operator's eye orientation, the computer measures the point of the operator's gaze, called a "gaze position" and times the amount/duration of the operator's gaze, thereby providing one indication (e.g., indicia) of interest in the item being observed and one method of measuring interest in the item being displayed. The computer also calculates a region of video screen surrounding the operator's gaze position. This region, for example, may be a circle that is calculated to include the operator's "actual gaze point" (as opposed to measured gaze position) with a certain probability.

The output from the gaze-tracking apparatus 3 (e.g., representing the movement of a user's eyes) is provided to the CPU 2. The CPU 2 in turn includes processing algorithms to map the movement of the user's eyes in terms of position on the display screen to which the user is observing, the speed of the movements of the user's eyes, and some information about the eye itself such as shape, size, etc.

Commercial and research prototype eye-tracking systems locate the position of human eyes and follow their movement. Eye-tracking has been successfully used in graphic user interfaces (GUI) to assist users, such as handicapped users, in various tasks.

In FIG. 1, the gaze tracking apparatus (e.g., camera) 3 is shown separate from the display 1. However, the camera 2 may be mounted or preferably embedded in the display 1 to detect, through the aid of the CPU 2, the user's presence, and to find/detect the location of the user's eyes.

For example, such a camera system 3 could be the same system that is used for iris-based identification as described in U.S. Pat. No. 5,572,596, incorporated herein by reference.

Once the location of the user's eyes is found, the direction of the user's gaze is determined by means such as described in one of the above mentioned patents or disclosure, incorporated herein by reference.

The eye gaze is mapped to a location on a display 1 that has items of information being scrolled thereacross. Such mapping is well-known especially for one of ordinary skill in the art taking the present application as a whole.

Figure 2:
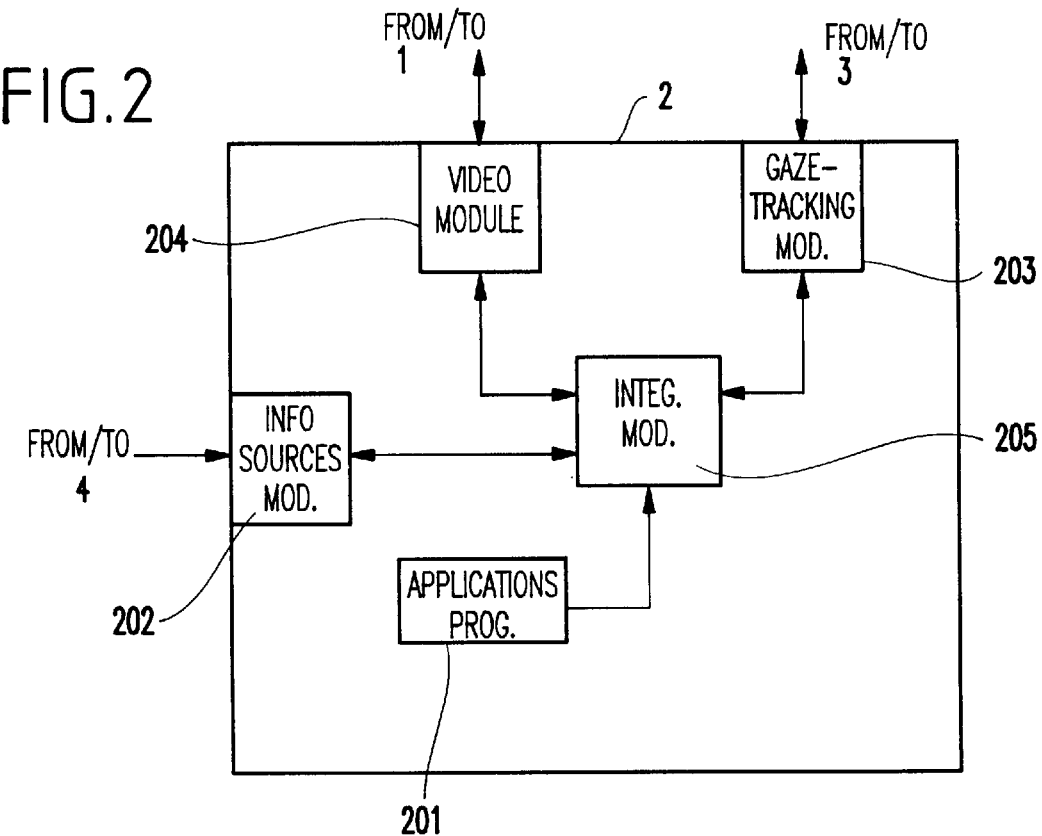
FIG. 2 illustrates a block diagram of a CPU 2 of the system according to the present invention.

FIG. 2 illustrates a block diagram of the CPU 2 and its constituent elements.

In an exemplary embodiment, the CPU 2 includes one or more application programs 201, an information source module 202 (e.g., a World-Wide Web (WWW) module in the exemplary embodiment), a gaze tracking module 203, an integration module 204, and a video module 205. It is noted that any type of information module may be employed, either additionally or alternatively to the exemplary WWW module 202.

The CPU 2 may be a custom-built machine, or one selected from any number of different products such as a known and commercially-available personal computer, computer workstation, mainframe computer, or another suitable digital data processing device. As an example, the CPU 2 may be an IBM THINKPAD® computer. Although such a CPU (computer) clearly includes a number of other components in addition those of FIG. 2, these components are omitted from FIG. 2 for ease of illustration and brevity.

The application programs 201 comprise various programs running on the CPU 2, and requiring operator input from time to time. This input may include text/images (e.g., entered via the gaze-tracking apparatus 3) as well as positional (if a cursor is employed with the system). Examples of application programs 201 include commercially available programs such as database programs, word processing, and the like.

The information sources module 202 includes a software module configured to receive and interpret signals from at least one information source. For example, as mentioned above, one information source may be the World-Wide Web. As a specific example, the module 202 may include a WWW driver that receives electrical signals representing inputs from the WWW 4.

The gaze tracking module 203 includes a software module configured to receive and interpret signals from the gaze tracking apparatus 3. As a specific example, the module 203 may include a program that receives electrical signals from the apparatus 3 and provides an x-y output representing an area or point (a number) where the operator is calculated to be gazing, called the "gaze position".

The video module 204 comprises a product that generates video signals representing images of text, etc. These signals are compatible with the display 1, and cause the display 1 to show the corresponding images. The video module 204 may be provided by hardware, software, or a combination. As a more specific example, the video module 205 may be a video display card, such as a Super Video Graphics Applications (SVGA) card.

The integration module 205 serves to integrate various inputs with eye gaze input (from the gaze tracking apparatus 3 and gaze tracking module 203). The integration module 205 applies certain criteria to inputs from the apparatus 3 to determine what the user is gazing upon.

Although the software programming associated with the gaze tracking apparatus 3 may be included with the apparatus 3 itself, the particular example of FIG. 2 shows the associated software implemented in a gaze tracking module 203, as described below. The module 203 may be included solely in a CPU 2, in the apparatus 3 or in a combination of the two, depending upon the particular application.

In utilizing eye-tracking in GUI interfaces, the GUI component the user is paying attention to must be determined.

Whereas traditional GUI components, such as a text window or a menu bar, are static, ticker items follow a pre-determined pattern of motion. By tracking a user's eye movement and comparing such movement with the ticker's planned motion, a very high level of confidence can be established regarding whether the user is paying attention to a particular item. As an exemplary case, stock information will be examined below.

For example, suppose that a stock ticker is scrolling stock items from left to right on the bottom of the screen of display 1. If the eye-tracking system 3 in association with the CPU 2 has detected that the user's eyes moved from point (x1, y1) at time T to point (x2, y2) at speed P, and if a particular ticker item such as, for example, the stock of International Business Machines (IBM) Corporation, also moved from point (x1, y1) at time T to point (x2, y2) with the speed of P, and if the distance between (x1, y1) and (x2, y2) is sufficiently long (e.g., a few inches), it is highly likely that the user is paying close attention to the IBM stock. Such an eye-tracking system may be implemented through the use of a comparator (not illustrated) for comparing a user's eye position with a fixed position and a timer (not illustrated) which times the duration of a user scanning the display screen. The longer that the person scans a particular message or display would indicate that the user has a high interest in the content of the information.

It is noted that the motion of items in a ticker display can be designed to force an attentive user to have more complex eye movements than simple vertical or horizontal movement.

For example, a ticker in which items are printed in typewriter fashion will cause users to move their eyes both horizontally and vertically. A ticker in which items are displayed in different sectors of a circle will cause attentive users to have more dramatic eye movements. Generally, if the user's eye movements follow the planned movement of a particular ticker item, then the more complex the eye movements, the higher confidence and determination that the user is paying attention to the particular ticker item.

There are several benefits of using eye-tracking technology to determine whether a user is currently paying attention to a particular ticker item.

First, eye-tracking enables the ticker system to enhance its usability by automatically providing additional relevant (and more detailed) information of the subject being viewed. Thus, the items of information each may have different "views". A "view" is a way to present information. As a rough example, time may be represented in various ways (or views) such as by Greenwich Mean Time (GMT) or Pacific Standard Time (PST). In a first view of "time", only the local time may be provided (e.g., PST), whereas in a second view the GMT may be provided. Hence, different views represent different levels of detail of the information.

For example, to achieve this benefit, information related to the same topic may be organized into different views such as a cluster of pieces of different detail levels. Such organization may be performed in many ways and is believed to be well within the grasp of one of ordinary skill in the art within the purview of the present application.

Such information may be accessible through the World Wide Web (WWW) 4 or other storage facilities for storing related data such as a diskette, the CPU 2, a direct access storage device (DASD) storage (e.g., a conventional "hard drive" or a RAID array)! magnetic tape, electronic read-only memory (e.g., ROM, EPROM, or EEPROM), an optical storage device (e.g. CD-ROM, WORM, DVD, digital optical tape, etc.), paper "punch" cards, or any other suitable signal-bearing media including transmission media such as digital and analog and communication links and wireless.

For example, the top level view (or detail) could be the "highlight" information, which is directly displayed as an item by a ticker interface.

The second level could be the "abstract", which contains information more than the highlight.

The third level could be "detail" information, which contains a detailed description of the topic.

Optionally, there can be a fourth level (or additional lower levels) of "related information", which contains any other information that in some way is related to the topic.

For example and returning to the example of the IBM stock being displayed on a monitor in a ticker-like fashion, the "highlight" of the IBM stock may be just its current trading value. The "abstract" of the IBM stock may contain its day-high, day-low, trading volume, and other financial summary information. The "detail" of the IBM stock may contain its performance over the past year or other predetermined time frame (e.g., detailed financial data). The "related" information may contain important news about IBM, similar to that provided currently provided by Point-Cast and the MyYahoo web page.

When the eye-tracking system (e.g., through use of the comparator and timer or the like) detects that the user is paying attention to a particular ticker item, the ticker system can automatically display the corresponding abstract, using additional screen real estate such as a small pop up text window or the like. The abstract can stand still or move along with the highlight of the ticker item.

If the eye-tracking system further detects that the user is looking at the abstract for a sufficiently long period (e.g., relative to the size of the abstract), the ticker system may automatically display the corresponding detail, and even related information. Hence, "reading behavior" can be determined through eye tracking. Once again, such a feature may be implemented with a comparator and timer system in which the comparator determines that the user is looking at the abstract, and a time-out period is reached. Upon reaching the time-out period, then the subsequent level of information is displayed.

As mentioned above, the eye-tracking system may implement such detection of the user's observation through a comparator and a timer (e.g., a timer having a predetermined time period) which upon the expiration of the predetermined time period (e.g., 3 seconds or the like depending upon the amount of information being displayed) automatically and sequentially generates and displays the related abstract, detail, and related information, with each iteration of the count-down of the timer.

It is noted that the specific mechanisms (e.g., the mechanism for displaying the abstract, detail, etc.) can be implemented by simply activating a browser that goes to and displays the relevant Web pages.

Operation of the Preferred Embodiment

Figure 3A:
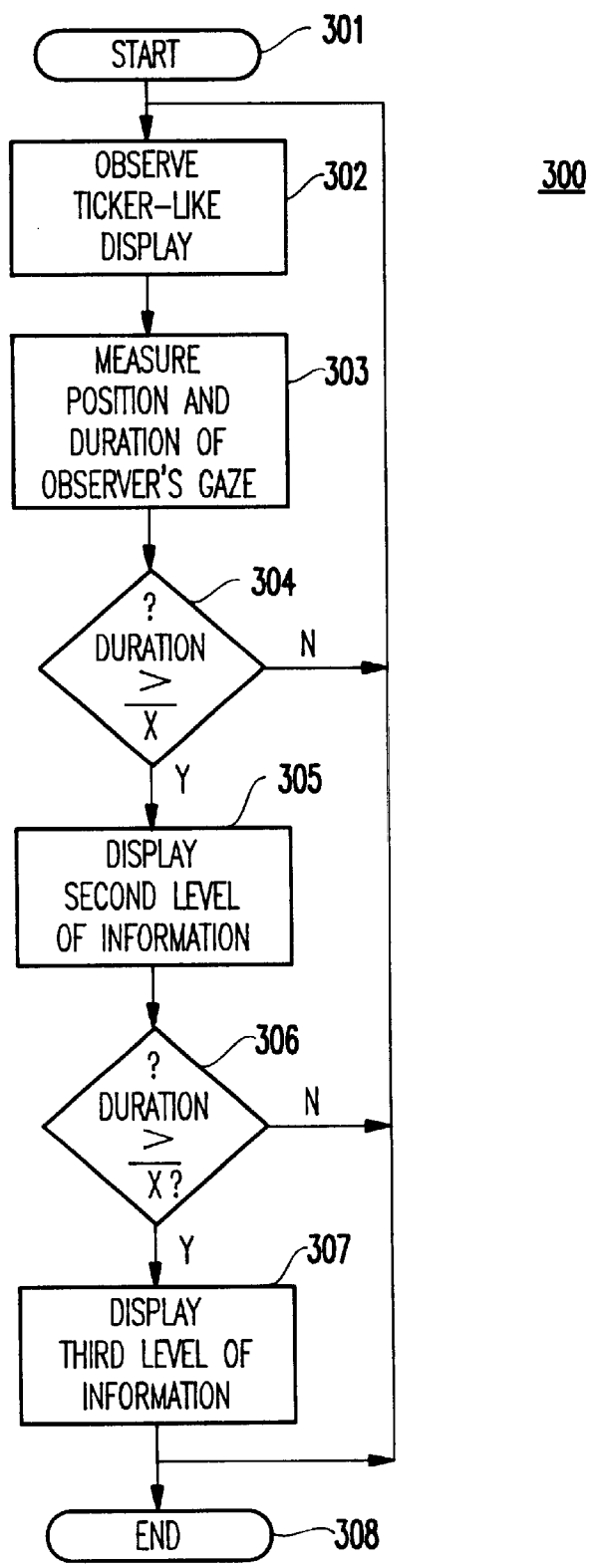
FIG. 3A illustrates a method of operation of the present invention.

FIG. 3A shows a sequence of method steps 300 to illustrate one example of the method aspect of the present invention. For ease of explanation, but without any limitation intended thereby, the example of FIG. 3A is described in the context of the hardware environment described above in FIGS. 1–2.

The process 300 is initiated in step 301. As an example, this may occur automatically through use of various known sensing mechanisms or the like, when the user requests a service, when the computer/CPU 2 boots-up, under control of one of the application programs 201, or when the operator manually activates a selection actuator (not illustrated) to indicate "start" to the inventive structure and method, or at another time.

In the illustrated example, when the routine 300 begins, the computer is booted up and the user is assumed to be observing ticker-like displays in step 301.

In response to step 302, the integration module 205 starts to monitor the operator's gaze position and the duration of the gaze position in step 303. The gaze position is a point where the gaze tracking apparatus 3 and gaze tracking module 203 calculate the operator's actual gaze point to be. This calculated point may include some error due to the limits of resolution of the gaze tracking apparatus 3, intrinsic difficulties in calculating gaze (e.g., accounting for head movement in corneal reflection systems, etc.), and other sources of error. These sources of error are collectively referred to as "system noise", and may be understood by studying and measuring the operation of the system 100. For example, it may be determined in some systems that the error between gaze position and actual gaze point has a Gaussian distribution.

In step 304, if the duration of the operator's gaze is greater than or equal to a predetermined time "X", then a second level of information is displayed in step 305. If the duration of the gaze is less than "X", then the process reverts back to step 302 to simply continue displaying the ticker-like items. It is noted that activation by dwell time (e.g., based on predetermined time "X"), may be too slow or too fast for particular users. Thus, it is envisioned that the dwell time may be user-defined. Additionally or alternatively to the dwell time, the behavior of the user may be monitored to provide even greater reliability. Such behavior could be user-defined. Further, the eye position could be synchronized with the ticker context. Thus, the apparatus would "know" how much of the message was read, and which part the user spent more time reading.

Step 307 (e.g., signifying the last level of detail being displayed) is displayed if the duration of the gaze for the second level of information is greater than "X". After the last level of detail is displayed, the process reverts back to step 302 or the process is completed when the CPU 2/display 1 are de-activated, as shown by step 308.

Figure 3B:
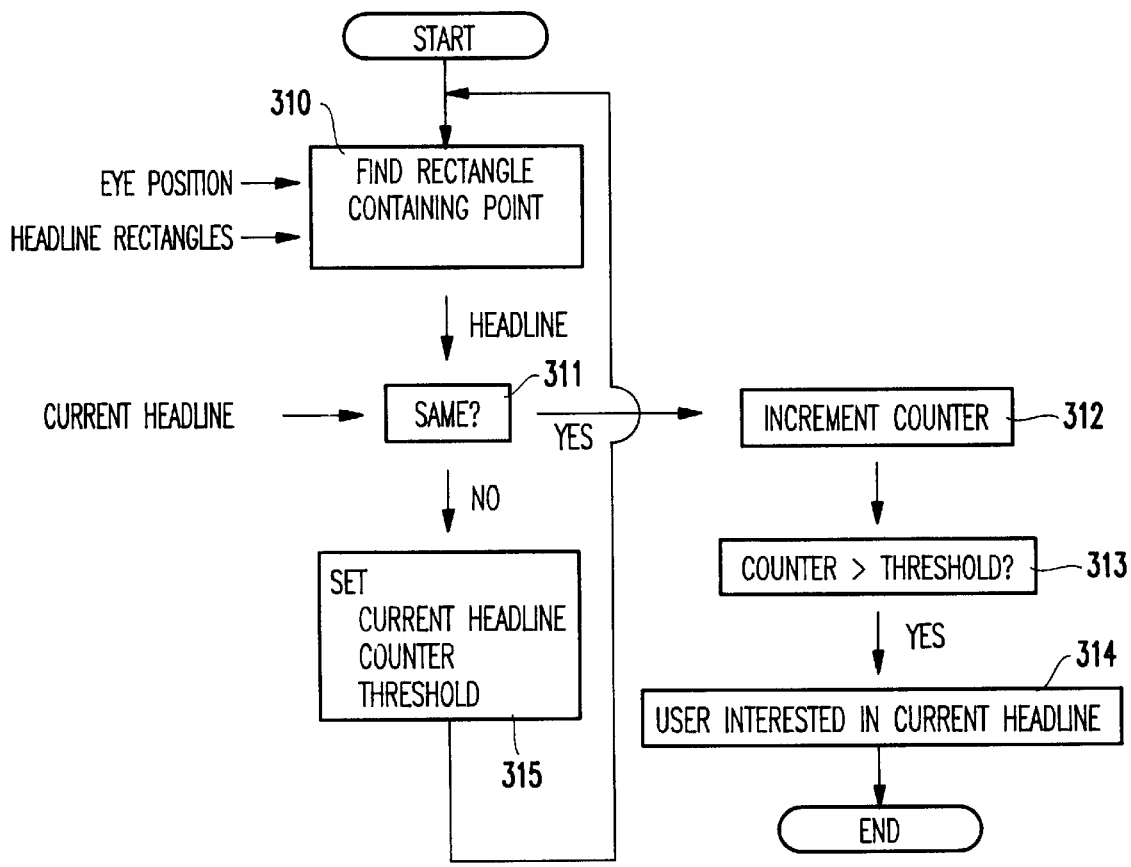
FIG. 3B illustrates a method of tracking ticker users according to the present invention.

FIG. 3B illustrates a method of tracking ticker users according to the present invention.

Specifically, to read a static (e.g., non-moving) display, users characteristically move their eyes (e.g., saccade) mostly forward through the text approximately every 200 milliseconds, jumping approximately eight characters at a time (e.g., see Rayner, K. and Pollatsek, A., *The Psychology of Reading*. Hillsdale, N.J.: Erlbaum. (1989). Thus, normal reading ability suggests people read approximately 40 characters per second.

On a one-line scrolling ticker display, information (e.g., so-called "headlines") flows right to left or top to bottom. Although eye-movement studies of users reading scrolling ticker displays are unknown, it is safe to assume that to read the headline, a user must look at it long enough to pick up all characters in the text. Given the standard reading data, then, for a five-word headline, the user would have to look at it for at least about one second to gather the characters of the text.

A method according to the present invention determines what headline a user is interested in proceeds as follows.

First, the user's eye position (e.g., an x and y location on the screen) is sampled approximately every 33 milliseconds (30 Hz). This position is used to determine what headline is being looked at (step 310).

More specifically, each headline is defined by a rectangle at a specific x and y location and with a specific width and height. Whereas the x (and/or y) location of the rectangle changes as the headline scrolls, its width and height remain constant.

Each time the user's eye position is sampled, the headline, if any, that the user is looking at is found by searching for the headline rectangle that contains the (x, y) position of the user's eyes (step 311). If one is found, this headline is considered to be the "current headline". It is noted that the current headline may change between consecutive samples. However, if the headline does not change between consecutive samples, then the user is assumed to be looking at the headline. If "NO" in step 311, then the current headline, counter and threshold are set in step 315.

The period during which the user looks at a particular headline is calculated by incrementing a counter for each consecutive sample during which the current headline does not change (step 312).

If the period the user is looking at the headline crosses a threshold (e.g., determined by the number of characters or words in the headline, at a rate of roughly 35 characters per second), then the user is said to be interested in the headline (steps 312\3, 314). This provides positive feedback to the system.

FIG. 3B illustrates this method, and specifically a method for determining user relevance in ticker-displayed headlines based on eye fixation.

A similar method can be used to determine whether a user is not interested in a headline.

Specifically, each time the current headline changes before the period crosses the interest threshold, the user is said to be uninterested in the headline. This provides negative feedback to the system.

Figure 4:
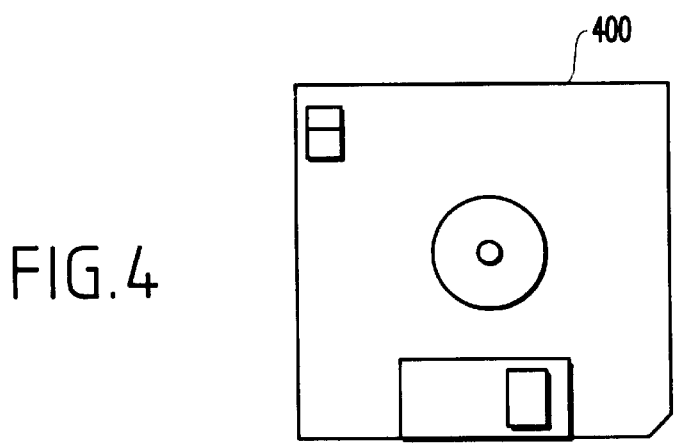
FIG. 4 illustrates a storage medium for storing steps of the program for gaze-based tracking of items (e.g., ticker items) on the display.

As shown in FIG. 4, in addition to the hardware and process environment described above, a different aspect of the invention includes a computer-implemented method for displaying ticker-like displays and measuring relevance feedback, as described above. As an example, this method may be implemented in the particular hardware environment discussed above.

Such a method may be implemented, for example, by operating the CPU 2 (FIG. 2), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 2 and hardware above, to perform a method to perform ticker-like displays.

This signal-bearing media may include, for example, a RAM (not shown) contained within the CPU 2, as represented by the fast-access storage for example. Alternatively, the instructions may be contained in another signal-bearing media, such as a magnetic data storage diskette 400 (FIG. 4), directly or indirectly accessible by the CPU 2.

Whether contained in the diskette 400, the computer 2, or elsewhere, the instructions may be stored on a variety of machine-readable data storage media, such as DASD storage (e.g., a conventional "hard drive" or a RAID array)! magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Another approach to using eye movement information with the ticker is to modify what is displayed by the ticker itself. For example, the ticker item may be displayed in a bolder font, an underlined font, an italicized font, with greater resolution, or the like, if the user is tracking it. Specifically, the camera system would provide an input to the CPU 2 indicating that the user is paying particular attention to an information item. As a result, the item is of interest could be displayed differently from other items, as discussed above.

Moreover, to save screen real estate as well as free up ticker real estate for additional items to be output, the ticker item could be displayed in a narrower or smaller font (e.g., displayed with a different attribute), or could be displayed with less resolution than normal if not being tracked, if the camera/sensor determines that the user is not tracking it.

Additionally, the ticker speed could be controlled. For example, if the user is looking at the left of the screen and the ticker is about to disappear, the ticker speed could be slowed down, to allow the user to read the ticker. Further, if the user is looking to the right of the screen, the user is "waiting" for the ticker. Thus, the ticker speed could be increased. In this way, the system adapts to the user's reading speed.

A third possibility is that by paying attention to some ticker item, other related information (e.g., such as more views (levels of detail), or related news stories) is displayed by the ticker itself. Programming such a capability is believed to be well within the grasp of the ordinarily skilled artisan within the scope and purview of the present application.

With the above in mind, a second major advantage of combining eye-tracking with ticker displays becomes evident. That is, the system according to the present invention allows relevance feedback to be passively obtained.

With the massive amount of digital information, all Internet-based information systems face the challenge of providing the users with quality information that is relevant to their individual personal interests. Hence, most existing systems demand (or at least strongly request) that users provide an explicit interest profile or explicit vote on individual web pages. Such activities put significant burdens on users, who want merely to get the best information with the least trouble in the quickest possible manner.

By integrating eye-tracking with a ticker display, the system according to the present invention can automatically collect valuable feedback passively, without requiring the user to take any explicit action such as completing a survey form, undergoing a registration process, or the like.

Using the same techniques described previously for determining whether to display more relevant information to a user, the system generates relevance feedback based on whether the user is paying attention to certain ticker items. Accordingly, the system "learns" the user's particular interests, and the system "adaptively" provides information regarding such interests to the user.

A key advantage of this approach is that the system may have different levels of confidence in the user's interests in a certain topic because it provides different levels of details for any ticker item. Thus, the system is adaptive to the user's interests, and stores information broadly representing the user's interests in a database or the like.

For example, if a user always pays attention to the details of the IBM stock, the system will record in the user's profile a strong interest in IBM and will collect and provide more information related to IBM for the user. For example, such collection and searching may take place by the system going out on the Internet and searching for such information and bringing it to the user, if on-line, or storing it for future use and display. By the same token, as mentioned above, the system is adaptive and will learn and modify its searching and displaying parameters over time and based on the user. For example, if many users use a specific terminal/machine, the machine may store the profiles based on user passwords or the like.

Thus, if the same user does not pay attention to IBM news, this negative feedback can also be noted in the user's profile, and, eventually the user's ticker will display mainly IBM stock information and not IBM news.

It is noted that the above-described operations of tracking of a user's eye movements and comparing them with the item movements in a ticker display, dividing information into different levels of details, automatically providing more relevant information based on detected user attention, and obtaining useful relevance feedback, are but a single specific embodiment of integrating eye-tracking with ticker displays in general. There are many other ways to implement the present invention.

Thus, while the invention has been described in terms of a single preferred embodiment, those skilled in the art will recognize that the invention can be practiced with modification within the spirit and scope of the appended claims.

For example, an eye-tracking system can be installed on a television monitor for receiving broadcast signals. For channels such as CNBC, CSPN, etc, which display highlights and scores using tickers, this disclosure can be applied to create interactive TV features, such as automatically adjusting the TV display and programming based on what the user is watching.

Generally, tickers work by putting in a fixed set of information into a queue and starting the information moving across the screen one at a time from the queue. If the ticker is displaying paid-for advertising, the size of the fixed set is very important to the advertiser, since advertisers wish their advertisement to "roll" across the screen as often as possible so their is a high likelihood it will be noticed by a user.

For example, if the fixed set has 10 advertisement items, each advertisement appears every minute, whereas if the set has 10,000 advertisement items, each advertisement appears only once per day.

Advertisers could pay more to have more presentation time, but then many of the items in a large fixed set are duplicates. As new information is received, the ticker updates the candidate list fixed set by deleting older information and inserting the new information, as is known. Any relevance feedback during this step is beneficial. Ideally, the system deletes the uninteresting items, keeps the interesting items and adds new items to be presented. This allows for directed advertisement which saves the advertiser money, and makes the user happier since the user is presented with mainly interesting (or related) items. By using the gaze information of the user, this relevance feedback is non-obtrusive and automatic.

Having thus described our invention, what we claim as new and desire to secure by Letters Patent is as follows:

1. A system for interactively displaying information, comprising:

a ticker display for displaying items having different views;

a tracker for tracking a user's eye movements while observing a first view of information on said ticker display; and means, based on an output from said tracker, for determining whether said first view has relevance to said user.

2. The system according to claim 1, further comprising:

means for providing relevance feedback such that view information having a common association are displayed to said user, based on an output from said determining means.

3. The system according to claim 1, wherein each said item is divided in advance into a plurality of information views from general to specific.

4. The system according to claim 1, wherein said tracker comprises a camera for providing an input representing a movement and location of eyes of said user.

5. The system according to claim 1, wherein said tracker further comprises a comparator for comparing said movement and location of said eyes of said user with a predetermined position of said eyes of said user.

6. The system according to claim 1, wherein said different views each comprise information having different levels of detail, said information being displayed sequentially according to said levels of detail, and wherein said tracker comprises a comparator for comparing said user's eye movements with said first view of said item of information.

7. The system according to claim 1, wherein said determining means comprises a central processing unit (CPU) for receiving an input from said tracker.

8. The system according to claim 1, further comprising means for indicating to said user that said system is monitoring said user, said means for indicating comprising means for changing a display of said information.

9. The system according to claim 8, wherein said display changes a state of an attribute thereof when said system is monitoring said user.

10. The system according to claim 9, wherein said attribute comprises at least one of color and a font of said display.

11. The system according to claim 1, wherein said determining means determines whether a person is reading said item having said first view.

12. The system according to claim 1, wherein said determining means determines whether a user has an interest in said item based on said relevance of said item to said user.

13. The system according to claim 1, wherein said determining means determines whether said first view has relevance to said user, and successively presenting a different view based on said relevance to said user.

14. The system according to claim 1, wherein said determining means performs an analysis on said item to determine whether said item has relevance to said user.

15. The system according to claim 1, further comprising means for determining whether a person is reading a view.

16. The system according to claim 1, further comprising means for providing relevance feedback to said user regarding a degree of relevance of said view has to said user, such that said user determines how said system views the user and said user's interest.

17. The system according to claim 1, wherein said first view comprises a method of presenting information.

18. The system of claim 1, wherein said ticker display moves and wherein the determining means determines whether a current view has relevance to said user based upon the user's eye movements corresponding to the moving of the ticker display.

19. The system of claim 18 wherein the determining means determines relevance based upon the distance that the ticker display has moved while the user's eye movements correspond to the moving of the ticker display.

20. The system of claim 1, wherein the system further comprises means for controlling the speed of the ticker display based upon the location of the user's eye movements and position on the ticker display.

21. A system for interactively displaying information, comprising:

a ticker display for displaying items each having different views;

a tracker for tracking a user's eye movements while observing a first view of information on said ticker display;

means, based on an output from said tracker, for determining whether said first view has relevance to said user; and means for providing relevance feedback to said user regarding a level of interest said user has in said first view.

22. The system according to claim 21, wherein said views comprise information having different levels of detail, said information being displayed sequentially according to said levels of detail.

23. The system according to claim 21, wherein said means for providing relevance includes means for changing a characteristic of said current view.

24. The system according to claim 23, wherein said characteristic includes a color coding of said current view.

25. The system according to claim 23, wherein said characteristic includes a font of said current view.

26. The system of claim 21, wherein said ticker display moves and wherein the determining means determines whether a current view has relevance to said user based upon the user's eye movements corresponding to the moving of the ticker display.

27. The system of claim 26, wherein the determining means determines relevance based upon the distance that the ticker display has moved while the user's eye movements correspond to the moving of the ticker display.

28. The system of claim 21, wherein the system further comprises means for controlling the speed of the ticker display based upon the location of the user's eye movements and position on the ticker display.

29. A system for interactively displaying information, comprising:

a ticker display for displaying items each having different views;

a tracker for tracking a user while observing a first view of information on said ticker display; and means, based on an output from said tracker, for determining whether said first view has relevance to said user, said means for determining including a timer.

30. The system according to claim 29, further comprising:

means for providing relevance feedback to said user regarding a level of interest said user has in said first view.

31. The system according to claim 29, wherein said tracker tracks at least one of a gesture for speech, head movement, movement proximate to the display, and eye movement.

32. The system of claim 29, wherein said ticker display moves and wherein the determining means determines whether a current view has relevance to said user based upon the user's eye movements corresponding to the moving of the ticker display.

33. The system of claim 32, wherein the determining means determines relevance based upon the distance that the ticker display has moved while the user's eye movements corresponds to the moving of the ticker display.

34. The system of claim 29, wherein the system further comprises means for controlling the speed of the ticker display based upon the location of the user's eye movements and position on the ticker display.

35. A method of tracking a ticker user, comprising:

providing a ticker display;

tracking a user's gaze at a ticker display while observing a first view of information on said ticker display; and based on said tracking, determining a relevance of said first view to said user and providing different views based on said relevance to said user.

36. The method according to claim 35, wherein said tracking comprises sampling an eye position of said user, and determining a headline that the user is looking at by searching for a headline rectangle in said display that contains an (x, y) position of the user's eyes.

37. The method according to claim 35, further comprising:

calculating a period during which the user looks at a particular headline by incrementing a counter for each consecutive sample during which the current headline does not change, wherein if the period the user is looking at the headline crosses a threshold as determined by a number of characters in the headline, then the headline is determined to be relevant to said user and thereby providing user feedback.

38. The method according to claim 35, wherein each time the current headline changes before the period crosses the interest threshold, the headline is determined not to be relevant to said user.

39. The system of claim 35, wherein said ticker display moves and wherein the determining means determines whether a current view has relevance to said user based upon the user's eye movements corresponding to the moving of the ticker display.

40. The system of claim 39, wherein the determining means determines relevance based upon the distance that the ticker display has moved while the user's eye movements correspond to the moving of the ticker display.

41. The system of claim 35, wherein the system further comprises means for controlling the speed of the ticker display based upon the location of the user's eye movements and position on the ticker display.

42. A method for interactively displaying information, comprising:

displaying items of information in a ticker display having different views, said information being displayed sequentially according to said different views;

tracking a user's eye movements while said user is observing a first view of an item of information;

based on said tracking step, determining whether said user has an interest in said first level of said item of information being displayed; and automatically providing a second view of said item of information when it is determined that said user has an interest in said first view of said item of information.

43. The method according to claim 42, further comprising:

providing relevance feedback such that items of information having a common association are displayed to said user, based on said determining.

44. The system of claim 42, wherein said ticker display moves and wherein the determining means determines whether a current view has relevance to said user based upon the user's eye movements corresponding to the moving of the ticker display.

45. The system of claim 44, wherein the determining means determines relevance based upon the distance that the ticker display has moved while the user's eye movements correspond to the moving of the ticker display.

46. The system of claim 42, wherein the system further comprises means for controlling the speed of the ticker display based upon the location of the user's eye movements and position on the ticker display.

47. A signal-bearing medium tangibly embodying a program of machine-readable instructions executable by a digital processing apparatus to perform a method of tracking a ticker user, said method comprising:

providing a ticker display;

tracking a user's gaze at said ticker display; and based on said tracking, determining a relevance of a view to said user and providing different views based on said relevance to said user.

48. The system of claim 47, wherein said ticker display moves and wherein the determining means determines whether a current view has relevance to said user based upon the user's eye movements corresponding to the moving of the ticker display.

49. The system of claim 48, wherein the determining means determines relevance based upon the distance that the ticker display has moved while the user's eye movements correspond to the moving of the ticker display.

50. The system of claim 47, wherein the system further comprises means for controlling the speed of the ticker display based upon the location of the user's eye movements and position on the ticker display.

51. A signal-bearing medium tangibly embodying a program of machine-readable instructions executable by a digital processing apparatus to perform a method of interactively displaying information, said method comprising:

displaying items of information on a ticker display having different views, said information being displayed sequentially according to said different views;

tracking a user's eye movements while said user is observing a first view of an item of information;

based on said tracking step, determining whether said user has an interest in said first level of said item of information being displayed; and automatically providing a second view of said item of information when it is determined that said user has an interest in said first view of said item of information.

52. The system of claim 51, wherein said ticker display moves and wherein the determining means determines whether a current view has relevance to said user based upon the user's eye movements corresponding to the moving of the ticker display.

53. The system of claim 52, wherein the determining means determines relevance based upon the distance that the ticker display has moved while the user's eye movements correspond to the moving of the ticker display.

54. The system of claim 51, wherein the system further comprises means for controlling the speed of the ticker display based upon the location of the user's eye movements and position on the ticker display.

* * * * *